United States Patent [19]

Mungons

[11] Patent Number: 4,705,448
[45] Date of Patent: Nov. 10, 1987

[54] CARRIER FOR THREE WHEELED VEHICLES

[76] Inventor: Edwin M. Mungons, 5906 Cresthaven, Apt. D-1, Toledo, Ohio 43614

[21] Appl. No.: 694,020

[22] Filed: Jan. 23, 1985

[51] Int. Cl.$^4$ .......................... B60P 3/06; B60R 9/00
[52] U.S. Cl. ............................ 414/462; 224/42.03 B; 224/42.08
[58] Field of Search ................ 280/402, 719; 414/462, 414/469; 224/310, 42.03 R, 42.03 A, 42.03 B, 42.07, 42.08, 42.43, 42.44

[56] References Cited

U.S. PATENT DOCUMENTS

| | | | |
|---|---|---|---|
| 2,494,411 | 1/1950 | Simi | 414/465 |
| 3,348,713 | 10/1967 | Will | 414/462 |
| 4,213,729 | 7/1980 | Cowles et al. | 414/462 |

Primary Examiner—John A. Pekar
Attorney, Agent, or Firm—George R. Royer

[57] ABSTRACT

The invention herein is a carrier apparatus for small three-wheeled vehicles, which carrier is adapted for external attachment to a motor vehicle for carrying the three-wheeled vehicle externally to said motor vehicle. The carrier apparatus has three major subcomponents, specifically, a basic connecting and support member, referred to as a main support member, which is rigidly affixed to a portion of the vehicle, multidimensional tilting device and a separate carrying platform. The main support member is provided with a member to pivot the carrier from a horizontal position upward to a position vertically aligned along the vehicle. A further pivoting device is provided to tilt the carrier downwardly to the ground in order to receive the three-wheeled vehicle from the ground, or reciprocally to unload the three-wheeled vehicle from the carrier. The carrying platform is adapted to support and hold the bottom portions of the wheels of the carried vehicle. Auxiliary devices are provided to secure the three-wheeled vehicle to the carrier apparatus.

1 Claim, 8 Drawing Figures

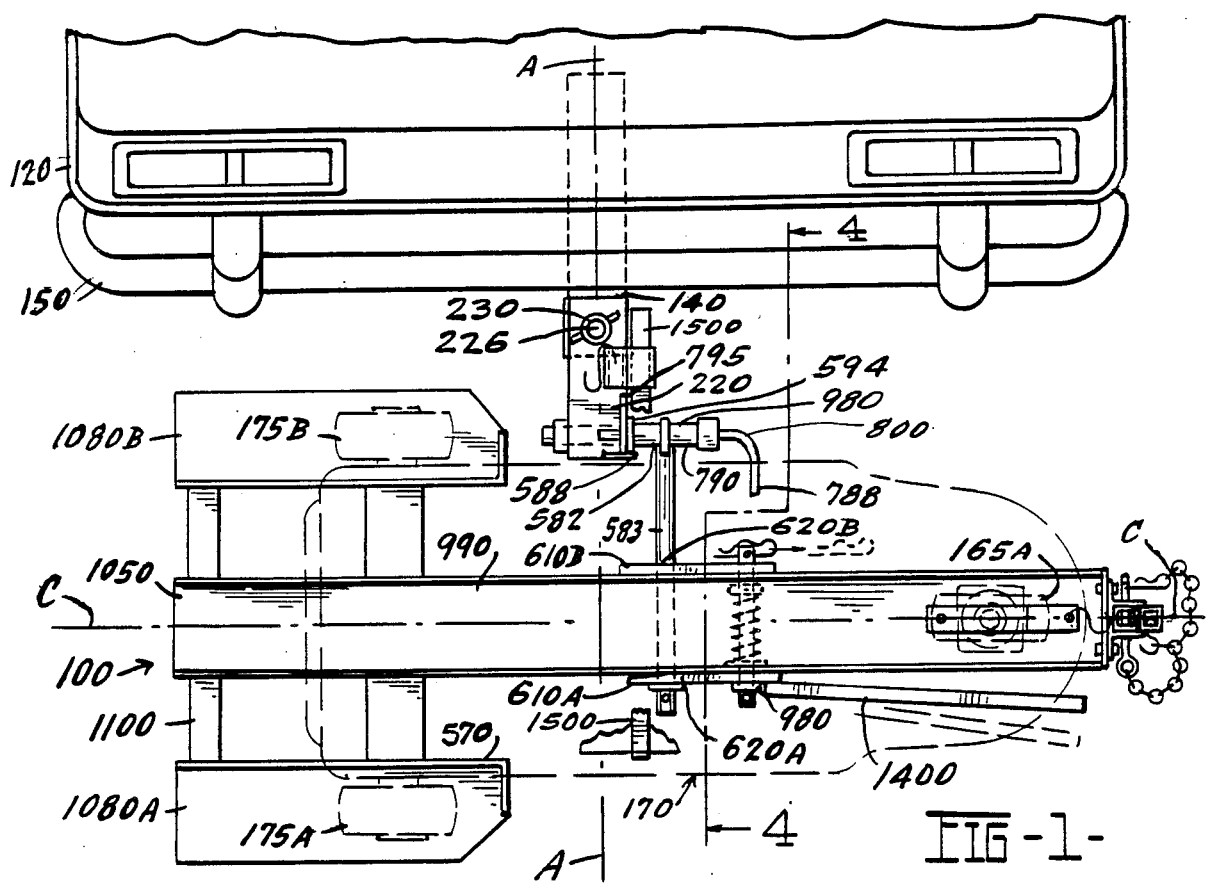
FIG-1-
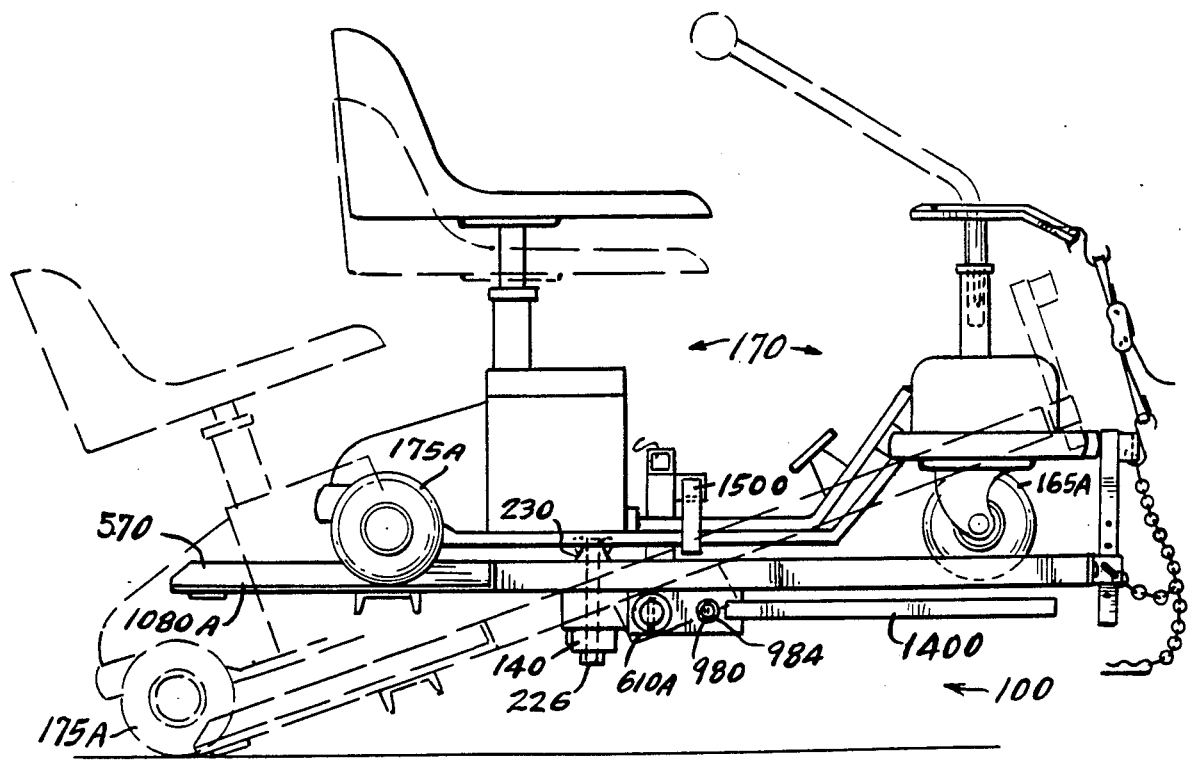
FIG-2-

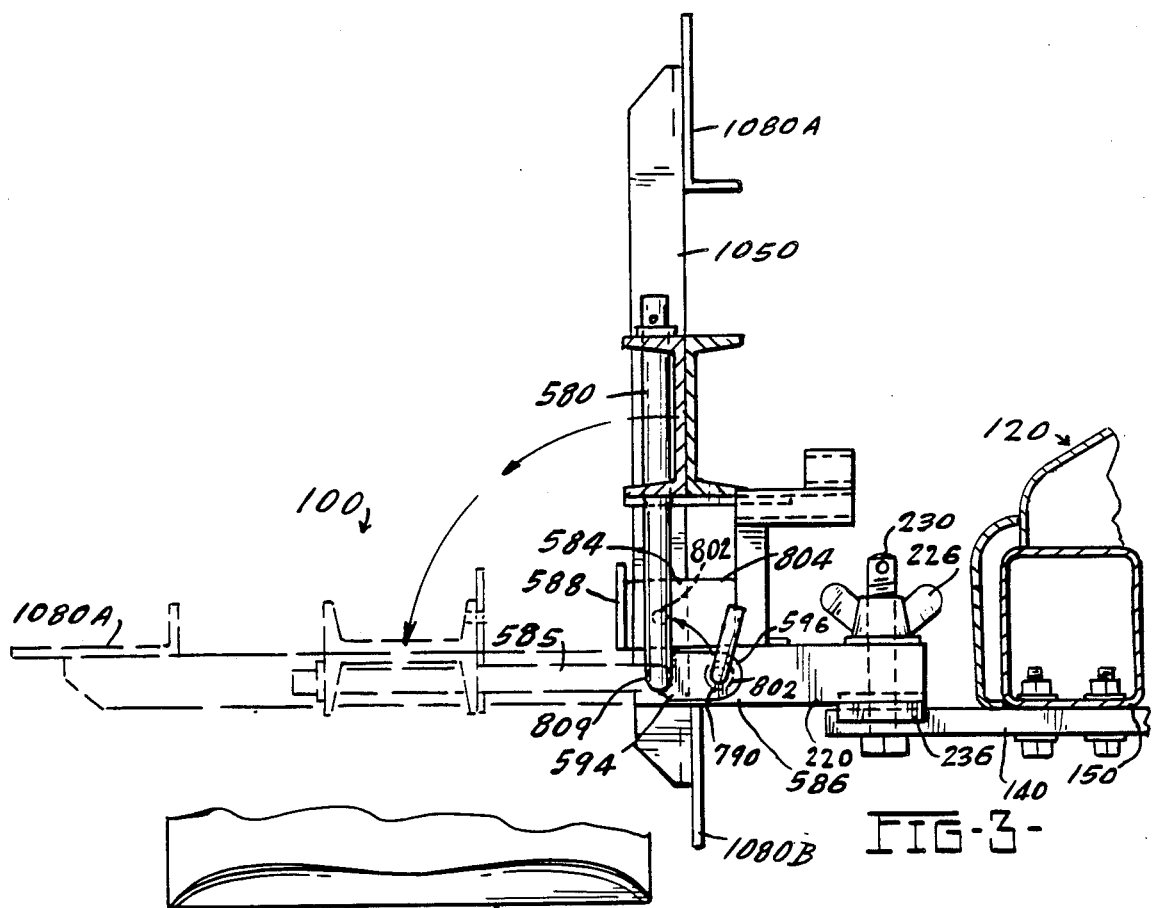
FIG-3-
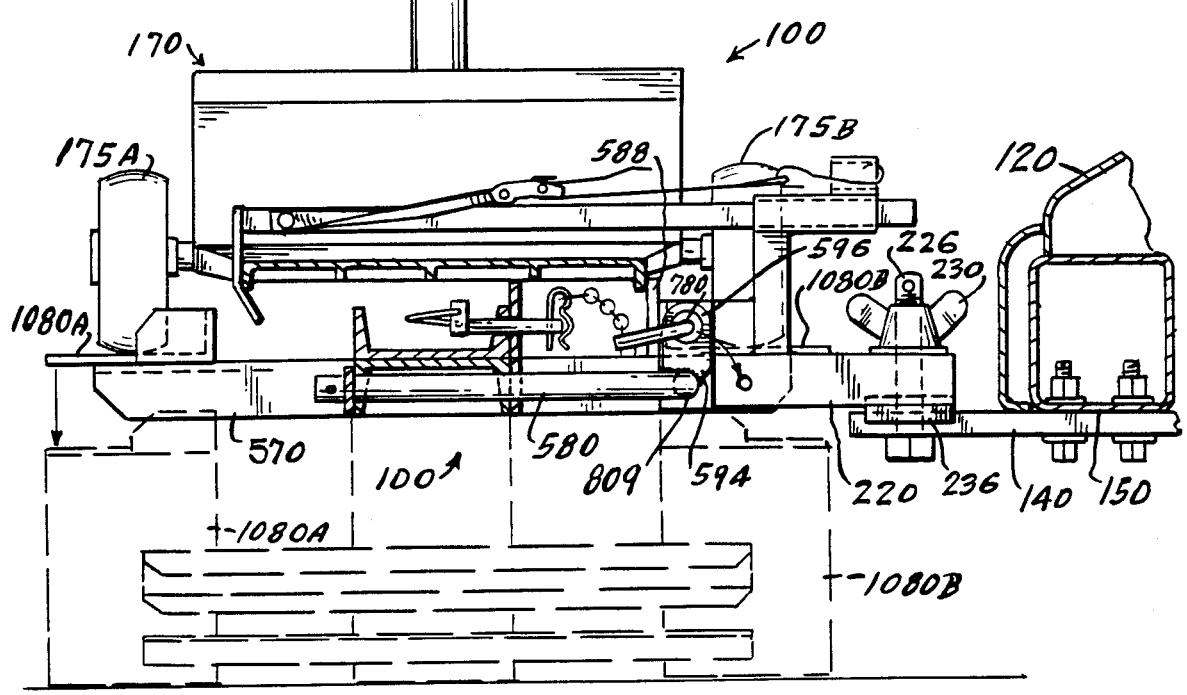
FIG-4-

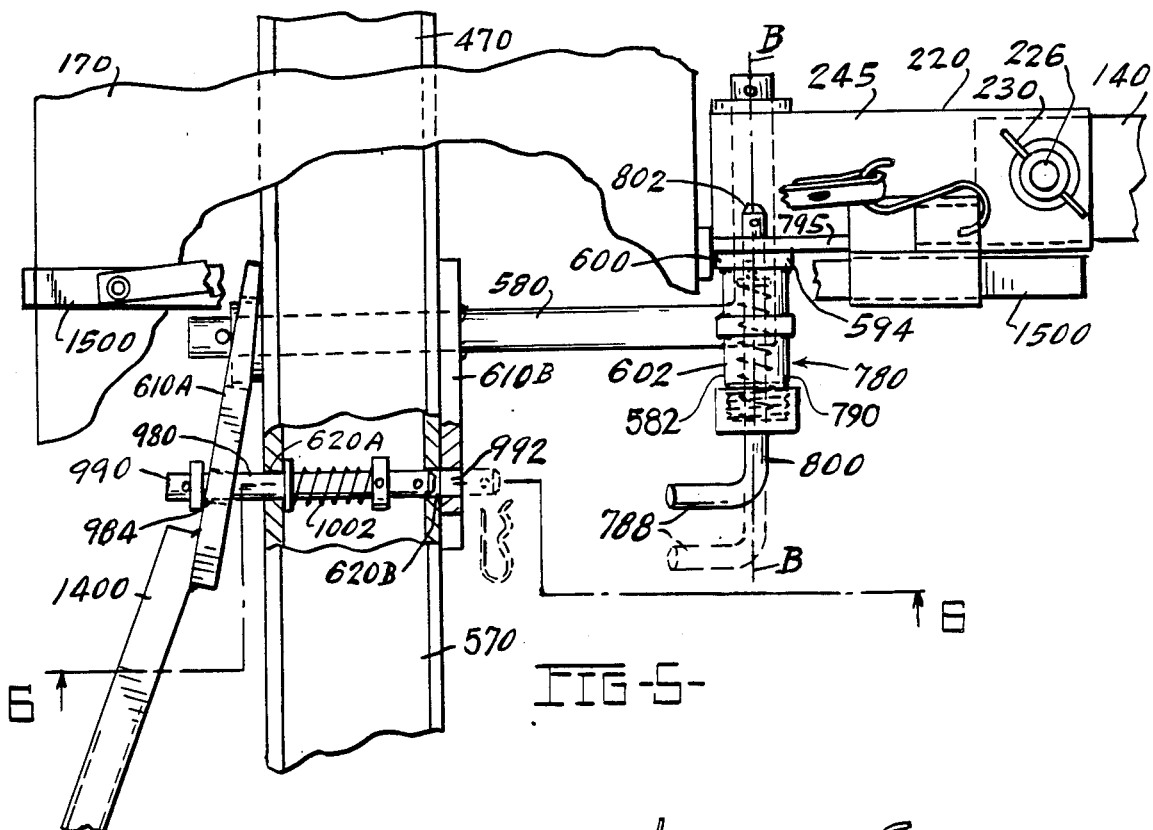
FIG-5-
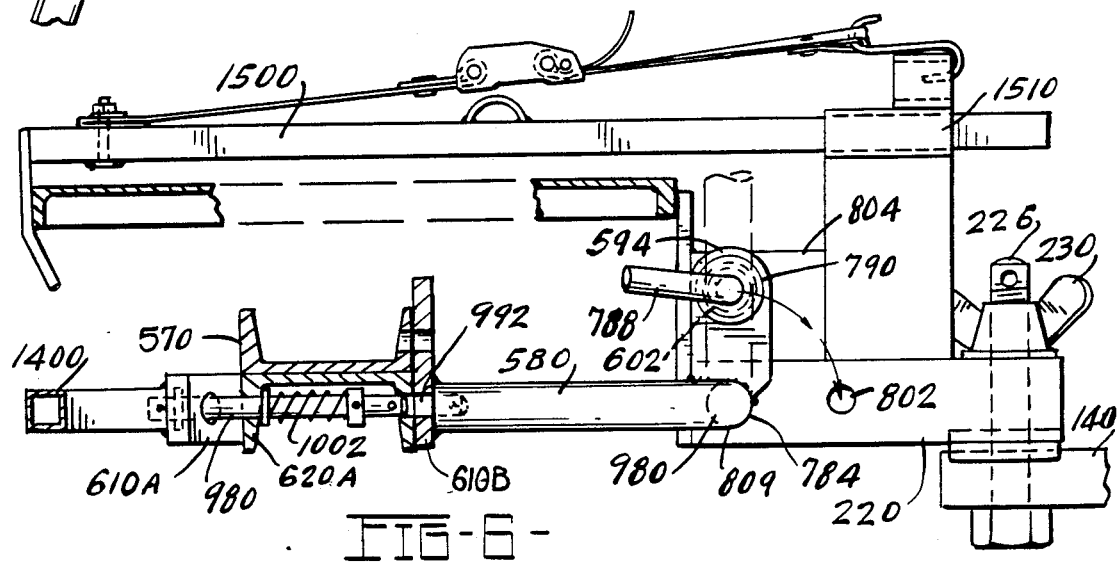
FIG-6-
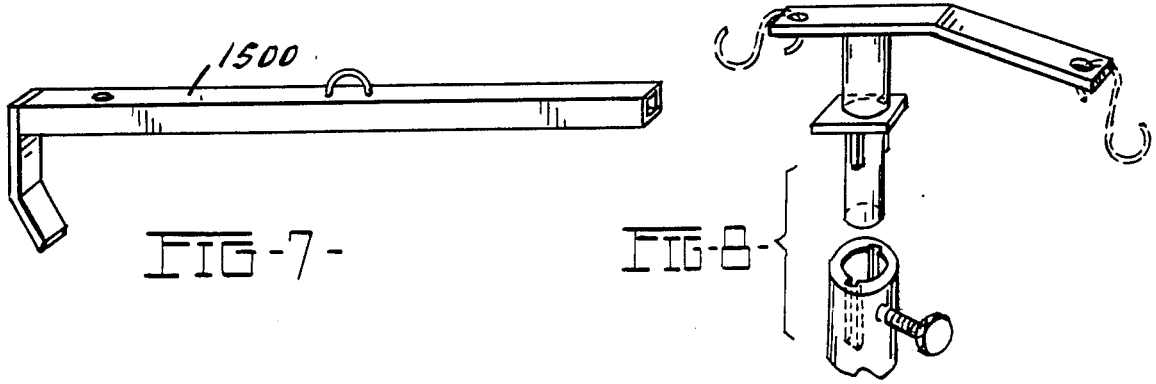
FIG-7-    FIG-8-

CARRIER FOR THREE WHEELED VEHICLES

BACKGROUND OF INVENTION AND DISCUSSION OF PRIOR ART

The invention herein is in the category of carriers adapted for rigid, external connection to a portion of a vehicle, wherein the carrier is structured to transport various objects thereon. As can be observed, the art area to which this invention is pertinent involves a broad scope of such carrier devices. The subect invention incorporates a significant development over such existing carriers and is particularly important in the carrier art used for transporting small vehicles.

Carriers that are generally connected to the rear portion of vehicles are usually adapted to transport different objects. It is obvious that in the existing relevant art, there is a wide variety of external carriers adapted for transporting small vehicles. From and overview of these various existing art structures, it is clear that carrying devices which are adapted for carrying small vehicles, such as bicycles and similar objects, few incorporate into one structural apparatus and concept the integrated features of portability, relative compactness of component parts when in either the operaable or inoperable position, versatile carrying capabilities and secure holding ability for the carried object. A very limited number of prior art carriers possess features complying to any degree a combination of the foregoing characteristics and criteris. Moreover, few prior art carriers exhibit any significant characteristics which permit the carrier apparatus to be stored readily against the vertical sides of the vehicle whenever the carrier is not in use. Additionally, few such devices have the capability of being easily tilted down to the ground level to facilitate the loading of the carrier object. Thus, the invention herein is a carrier which is conceived and adapted to overcome many of the foregoing problems and deficiencies that exist in the prior art.

In this latter respect, it is to be observed that the subject invention is adapted mainly as a carrier for appendage to the side of a vehicle. Rooftop carriers are frequently used, but such rooftop carriers cannot be widely used, in view of the requirement of lifting the object up or down off the vehicle roof. Even certain side or rear-end carriers are difficult to use since a bulky or heavy object must still be lifted even a few feet to be placed on top of the carrier. The subject device herein is adapted primarily to alleviate such lifting requirements.

There are several other problems that are usually encountered with the construction of existing carriers adapted for location on the rear of a motor vehicle. One such problem found with the construction of presently known carriers, is that many such carriers involve complex, intricately integrated parts which lead to expensive manufacturing conditions. Other problems with existing carriers, which are adapted for connection to the posterior of a vehicle as stated above, are seen in the lack of relative portability of such devices and ease of handling for persons with limited physical capacity or mobility, such as handicapped or aged persons, for example. The subject invention is directed and conceived in order to overcome these variant problems in order to provide an improved carrier for appendage to the exterior of a motor vehicle so that it is easy to construct and use by such persons of limited mobility, and the following objects of the subject invention are directed accordingly.

OBJECTS

By reason of the foregoing, the following are objects of the subject invention:

An object of the subject invention is to provide a versatile external carrier for small vehicles;

It is an object of this invention to provide a motor vehicle carrier for attachment which is easily disassembled or stored when not in use;

It is an object of the subject invention to provide an improved carrier for objects;

Another object of the subject invention is to provide a multipurpose carrier that is easily loaded or unloaded;

Yet another object of the subject invention is to provide an improved small vehicle carrier for attachment to a motor vehicle;

Another object of the subject invention is to provide a vehicular carrier that is readily usable for small three-wheeled vehicles;

Another object of the subject invention is to provide a carrier for small three-wheeled scooters, as used by handicapped persons, which can be attached to an automobile or other land vehicle;

Yet another object of the subject invention is to provide a vehicle carrier which is readily assembled without substantial physical difficulty;

Still another object of the subject invention is to provide a carrier which is easily stored against the side of the vehicle;

A further object of the subject invention is to provide an improved three-wheeled vehicular carrier that does not require extrinsic holding means in order to keep the carrier in place;

Another object of the subject invention is to provide a carrier for small three-wheeled scooters used primarily indoors by handicapped persons;

Another object is to make available ease of transportation to to the vehicle user.

Yet another object of the subject invention is to provide a carrier for the rear of an automobile or other land vehicle which is easily disassembled to assembled when not in use;

Still another object of the subject invention is to provide a small scooter carrier that is relatively simple to manufacture and assemble and disassemble;

Another object of the subject invention is to provide a carrier for vehicles which is relatively compact;

Yet another object of the subject invention is to provide an improved carrier for small vehicles used by handicapped persons;

A further object of the subject invention is to provide a lightweight carrier which is durable;

An object of the subject invention is to set forth a small scooter carrier for external attachment which is compact and relatively light in structure;

It is an object of this invention to provide an improved object carrier or external attachment to a land vehicle;

Another object of the subject invention is to provide a small scooter carrier device for connection to a motor vehicle which is durable, yet easily disassembled;

A further object of the subject invention is to provide an improved device for securing a small vehicle to an external carrier used on motor vehicle;

Other and further objects of the subject invention will become apparent from a reading of the following drawings taken in conjunction with the description of the preferred embodiment.

DRAWINGS

FIG. 1 is a top elevational view of a preferred embodiment of the subject invention, shown disposed at the rear of the vehicle to which the subject carrier is attached;

FIG. 2 is a rear elevational view of the subject invention, shown from the rear of the vehicle as being appended to the rear of a vehicle;

FIG. 3 is a side elevational view of the subject carrier shown partially in section;

FIG. 4 is a front end elevational view of the subject invention, shown partially in section;

FIG. 5 is a top elevational view of the dual pivoting mechanism used in the subject invention;

FIG. 6 is a side elevational view of the subject invention, shown partially in section showing a portion of the dual pivoting mechanism;

FIG. 7 is a perspective view of a vertical securing device used in conjunction with the subject invention;

FIG. 8 is a perspective view of an alternate securing device used in conjunction with the subject invention.

DESCRIPTION OF GENERAL EMBODIMENT AND SUMMARY OF INVENTION

The subject invention is a small vehicular carrier for a motor vehicle. Generally, the apparatus herein and its structural principles are adaptable as a carrier that can be positioned on the front or rear of any land vehicle. While the preferred structure of this invention is intended to include utilization thereof as a small three-wheeled vehicle carrier, adapted to be affixed on the rear of a vehicle, its potential uses and location of connection varies significantly, as can be determined from an overview of this application.

Overall, the subject invention is comprised of a central support and connecting member rigidly connected to a hitching member or other appendage from the vehicle, so as to project fixedly in a longitudinal manner from the rear of the vehicle so as to extend a given minimal distance away from the back of the vehicle. As indicated, however, the carrier herein can be appended in some integral fashion to other portions of the motor vehicle to which it is affixed. This central connection and support structure, referred to as the main support member, is the central connecting device that rigidly affixes the general carrier body to the motor vehicle. This main support member is adapted to be connected to the rear bumper, a trailer hitch, or other vehicular appendage extending rearwardly from the rear portion of the motor vehicle so as to effect a rigidly projecting connecting member. The important facet about this main support member is that it must be rigidly attached to the motor vehicle in some fashion so as to be rigidly immovable from a longitudinal, vertical, or lateral perspective.

Rigidly affixed to this main support member are dual pivotable means to allow the device to the pivoted through two separate movements, one to pivot the device downwardly to allow the carrying platform to be loaded or unloaded, while the other pivoting apparatus allows the carrier apparatus to be tilted upwardly in the storage position to the rear of the vehicle. This upwardly storage position helps facilitate safety in use or storage of the subject invention.

The carrier is additionally equipped with locking devices as an auxiliary appendage to lock the vehicle onto the carrier platform when carried. Specific elements and aspects of the subject invention will be set forth in the following description of a preferred embodiment of such invention.

DESCRIPTION OF PREFERRED EMBODIMENT

The following description of a preferred embodiment of the subject invention will be a description of only one potential embodiment contemplated to be within the scope of the subject invention. Therefore a description of a preferred embodiment of the subject invention will not be considered as limiting the scope of the invention.

It is to be noted that in describing the preferred embodiment of the subject invention, the following definitions, reference points, and referal axes will be utilized. In view of the fact that the preferred embodiment of the subject invention is a carrier apparatus for attachment to the rear of a vehicle, the word "frontal" will be used in reference to the front area of a vehicle, while the words "posterior" or "rear" will be used relative to directions toward the rear of such a vehicle and generally extending towards a rearward direction therefrom. The words "longitudinal central axis" will refer to that axis which extends through the center, as seen in cross-section, of an object from the one end to the other end thereof over its longest extend; or alternately stated, from one extreme point to the most distal point therefrom. The word "longitudinal" or "longitudinally extending" shall mean a direction extending more generally lengthwise in a given direction than otherwise. The word "transverse" will mean the lateral or width distance over a given object, which will be considered generally perpendicular to the longitudinal central axis of such object. The word "upper" will refer to distances extending above and away from the ground and the word "lower" will refer to those areas extending toward the ground reference. In this latter respect, the ground reference will be considered level or horizontal. Whenever the words "left" or "right" are used in the following description, they will be used, unless otherwise stated, in reference to an orientation of the left and right hand when one faces the carrier from a position posterior to the vehicle to which the carrier is connected.

Attention is now focused particularly to FIGS. 1 and 2 of the drawings in which a preferred embodiment of the subject invention is shown as a carrier apparatus 100, incorporating the features of the subject invention. The carrier apparatus 100 is adapted particularly as a carrier for small three-wheeled vehicles for connection to the rear of a motor vehicle 120 through a rearwardly projecting, rigidly attached hitch member 140 of the type generally used to connect trailers. It is stressed that the subject carrier apparatus 100 can be attached directly to other parts of the motor vehicle 120, such as rear bumper 50, or other suitable fixed objects on the motor vehicle 120 with appropriate attachment fixtures.

As seen and stated, the carrier apparatus 100 specifically described herein and shown in the drawings is particularly adapted for carrying a small three-wheeled vehicle or scooter 170 with front wheel 165A and back wheels 175A and 175B respectively, as represented in FIGS. 2 and 4. It must be indicated, however, that the physical apparatus of this carrier apparatus 100 can be used to carry various other types of objects or small vehicles, not shown or described. Also, as stated above, the carrier apparatus 100 herein can be used on the front of any vehicle. However, for the purpose of describing a specific embodiment and application, the carrier apparatus 100 is described as being generally preferably appended to the rear portion of a motor vehicle 120, as shown in the drawings, with application of the embodiment described herein particularly directed to a small three-wheeled scooter 170.

In general, the carrier assembly 100 is comprised of five subcomponents. Specifically, it has a rigidly affixed main support member 220, carrying platform 470, an intermediately disposed L-shaped support arm member 580 with perpendicular leg 582 which arm member is adapted to hold and support the carrying platform 990, and a first pivoting and locking apparatus 780 and a second pivoting apparatus 980. The specific details of the structure and operation of these subcomponents will be specifically described hereinbelow.

As seen, the main support member 220 is adaptable and intended for attachment to the rear end of any vehicle 120, as shown. This rigid main support member 220 is a parallelopiped shaped member extending rigidly in a posterior direction from the trailer bumper hitch 140 appended to vehicle bumper 150 of vehicle 120 in a longitudinally extending manner with its longitudinal central axis A—A, as shown in figure one, being aligned parallel to the longitudinal, front-to-rear, central axis of the vehicle 120. In the embodiment shown in the drawings, the main support member 220 is secured to trailer hitch member 140 through bolt 226 being inserted through appropriately bored and coaxially aligned bores, not shown, disposed in the main support member 220 and hitch member 140 and thence locked into place by bolt 230, as shown. An intermediately disposed holding member 236 is placed between the support member 220 and the hitch member 140 to prevent lateral movement of the main support member 220.

The main support member 220 may be constructed in any form or configuration and may be affixed to motor vehicle 120 in any fashion, with or without a trailer hitch assembly, and may be affixed in a direct manner to the bumper 150 or other portion of the motor vehicle 120, as is suitable. It is preferable that the longitudinal central axis of the main support member be aligned along the longitudinal central, front-to-rear, axis A—A of the automobile, as shown in FIG. 1.

As seen in FIGS. 1 and 6, there is pivotally mounted to the main support member 220 a first pivotal member 780, which first pivotal member is a longitudinally extending member which is pivotally mounted to the right side of main support member 220, as that the first pivot member 780 is able to rotate relative to the main support member 220 in a vertically extending plane which is just offset from the longitudinal central axis A—A of the main support member 220. The first pivot member 780 is comprised in part of a longitudinally extending tubular housing 790 which tubular element is rotatably mounted the right side face 795 of the main support element 220, as seen in FIG. 5. Such tubular element 790 is a hollow member adapted to concentrically receive in longitudinal fashion the longitudinally extending handle member 800, with its grasping or handle end 788 being disposed in perpendicular fashion to the shank of such handle member. The handle member 788 is adapted to reciprocally move in the longitudinal hollow chamber of the tubular housing 790 and when the handle member 788 is pulled laterally to the right from the detent opening 802 disposed in the right face 795 of the main support member 220, the tubular housing 790 is free to rotate about its longitudinal central axis B—B, which latter axis is substantially perpendicular to the longitudinal central axis A—A.

Integrally positioned to the right face 795 of main support member 220, as viewed from the right side thereof is a vertically extending flanged plate member 804 of basically rectangular disposition. Specifically, flanged plate 804 as shown in the drawings, is integrally disposed to the right face of the main support member 220 so that its one surface lies flush in a fixed relationship along the right side face 795 of main support member 220. A portion of flanged plate 804 extends and protrudes vertically up from the upper surface of the right face 795 of main support member 220. FIG. 3 shows the structure of the flanged plate 804 and displays the distance which flanged plate 804 extends above the upper surface of main support member 220. A circular bore 809 is adapted to receive a cylindrical shaft, extends transversely through the posterior end of main support member 220, as shown in FIG. 5. The longitudinal central axis B—B of such bore 809 is disposed horizontal and parallel to the ground and is generally perpendicular to the longitudinal central axis A—A of main support member 220, as represented. The circular bore 809 is formed transversely through main support member 220 so that it is adapted to receive in pivotable fashion the left end of the first pivot member 780 for rotational movement of said first pivot member 780 about the longitudinal axis B—B of said bore 809. This latter feature enables the first pivot member 780 to rotate relative to the main support member 220 in a vertical plane.

As seen in FIG. 5, there is an abutment member 898 on the end of flanged plate member 804 which serves to limit the rotational movement of the tubular housing to a ninety-degree movement, specifically from a position that is vertical to one that is horizontal as represented in FIG. 3. These two respective rotational limiting positions are the horizontal position shown in FIG. 3, such horizontal position being the use position of the carrier, to the vertical position shown in the storage position. As stated, the abutments on the flanged plate serve to limit the rotational movement of the carrier to and through these two respective positions, as described in more detail below.

Rigidly affixed to the first pivot member 780 is the cylindrically configured support arm member 580. The frontal end of support arm member 580 is welded or rigidly joined to the rotatable housing 790 such that the support arm 580 will move through an arc defined by the aforesaid perpendicular relationship, as represented in FIG. 3 and this perpendicular, or ninety-degree, movement between the horizontal position shown and the vertical position shown in FIG. 3 is the movement of the entire carrier assembly between the use position and the vertical storage position. As stated, integrally disposed on the posterior end of the support arm 580 is a leg 582 which is perpendicular arm 580. The leg 582 is rigidly integrally attached to the outer surface of the tubular housing 790, as shown in FIG. 6.

Rotatably mounted to the upper surface 585 of the support arm member 580 is the carrying platform 470, as shown in the drawings. More particularly, central platform member 470, being a longitudinally extending member of rectangular configuration, as shown in the drawings, functions as the central support member of the carrying platform 470 and further functions to allow the front wheel to travel on it and be supported thereon in the right extreme position shown in FIG. 2. As seen, the longitudinal central axis C—C of the central carrying platform member 470 is disposed as seen perpendicular to the longitudinal central axis of the motor vehicle 120 so that the vehicle 170 to be carried on platform 990 is aligned in a perpendicular position relative to axis A—A.

The particular features of interfaced mounting of the bottom surface of carrying platform member 470 is described as follows: Affixed on the bottom surface of the central platform member 470 are parallel rectangular flanged plates 610A and 610B which are affixed on the middle portion of the respective front and rear sides 610A and 610B of the central platform member 570, as shown. Such flanged plates 610A and 610B as seen in the drawings depend vertically downward in a parallel scheme below the lower surface of the central platform member 470. As seen in FIGS. 1 and 2, each plate 610A and 610B has a circular bore 620A and 620B therein, and as seen in the drawings, such bores 620A and 620B are coaxially aligned. As can be seen from a view of FIGS. 1 and 5, the rectangular plate 610B is slidably affixed to the side of central platform member 470, so that it is immovable relative thereto. On the other hand, plate member 610A is affixed against the side of central platform member 590 in a different manner than plate 610. Specifically, the frontal, inner surface of rectangular plate member 610 is pivotally mounted to the extreme posterior end of the support arm 580, as shown. As seen, a portion of the frontal surface of the rectangular plate 610A, that is the left end of such rectangular plate 610A, is beveled or inclined so that the plate 610A can move reciprocally to a limited extent, back and forth in a limited angular movement relative to the side of the carrying platform 890. Machined into the right end or side of the rectangular plate 610A is a bore 984 which is adapted to receive a longitudinal extending rod 990. In similar fashion, plate 610B has a bore 992 which is coaxially aligned with bore 984. Rod 990 is spring-loaded with helical spring member 1002, and by this latter arrangement, when plate 610A is pulled to the rear position shown in FIG. 5, the rod 990 will be pulled out of bore 992 to permit the central platform member to rotate relative to the rectangular plate 610B and the support arm member 580, as seen in FIG. 2. In the downwardly depending position shown in FIG. 2, the vehicle 170 can be loaded onto the carrying platform 470, while the horizontal position shown in FIG. 2 is the use or carrying position.

As shown in FIG. 1, the carrying platform is comprised of the central platform member 1080 and lateral platform members 1080A and 1080B. These lateral platform members 1080 and 1080B are rectangularly shaped members, which are adapted to carry the rear wheels 175A and 175B of the vehicle 170. In the preferred embodiment of the subject invention, the lateral platform members 1080A and 1080B are joined to one another and the central platform member 1050 by longitudinally extending support bar member 1100. Lever arm 1400 is provided to assist the user of the carrier in moving the rectangular plate 610A out from the side of the central platform member 470.

As can be further seen, auxiliary locking devices are provided to secure the vehicle to the carrier. Specifically, a vertical support arm 1500 is provided to hold down the upper portion of the vehicle to be carried. A slot 1510 is provided in the carrier 100 to hold the lower portion of the support arm 150.

I claim:

1. A carrier for a three-wheeled vehicle, said carrier being adapted for attachment to the rear of a motor vehicle, comprising:
    (a) rigid support means, with a longitudinal central axis adapted to be affixed to the rear portion of said motor vehicle, wherein said rigid support means projects away from the rear of said vehicle in a posterior direction;
    (b) a first pivot member having longitudinal extent, affixed to said first pivot member wherein said first pivot member is adapted to pivot in a vertical plane relative to said rigid support means, said first pivot member having a first face and a second face;
    (c) a second pivot member pivotally mounted to said first pivot member, wherein said second member is adapted to pivot relative to said first pivot member in a plane which is perpendicular to the longitudinal central axis of the rigid support member, said second pivot member having a first side and a second side;
    (d) carrying platform means, with an upper surface, rigidly affixed to the upper surface of said second pivot member wherein the upper surface of said carrying platform is adapted to carry a therewheeled vehicle, which platform means is comprised of a longitudinal extending intermediate wheel track and two lateral wheel tracks on each side of said intermediate track;
    (e) locking and unlocking means affixed adjacent said second pivot member, wherein said locking and unlocking means is comprised of a plate member affixed against the first side of said second pivot member, and which plate member is adapted to pivot away from a part of said second pivot member to release said second pivot member for pivotal movement.

* * * * *